(12) United States Patent
Nakanishi

(10) Patent No.: US 9,947,475 B2
(45) Date of Patent: Apr. 17, 2018

(54) CERAMIC CAPACITOR AND METHOD FOR MANUFACTURING SAME

(71) Applicant: Murata Manufacturing Co., Ltd., Nagaokakyo-shi, Kyoto-fu (JP)

(72) Inventor: Toru Nakanishi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 7 days.

(21) Appl. No.: 15/368,718

(22) Filed: Dec. 5, 2016

(65) Prior Publication Data

US 2017/0169950 A1    Jun. 15, 2017

(30) Foreign Application Priority Data

Dec. 10, 2015    (JP) .................................. 2015-241215

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC ............... *H01G 4/30* (2013.01); *H01G 4/012* (2013.01); *H01G 4/1227* (2013.01); *H01G 4/1236* (2013.01); *H01G 4/232* (2013.01)

(58) Field of Classification Search
CPC ............ H01G 4/30; H01G 4/005; H01G 4/06; H01G 4/012; H01G 4/12; H01G 4/232; H01G 4/248; H01G 4/228
See application file for complete search history.

(56) References Cited

U.S. PATENT DOCUMENTS

| 8,837,111 B2* | 9/2014 | Take | H01G 4/30 |
| | | | 361/303 |
| 2005/0194084 A1 | 9/2005 | Yoshida et al. | |
| 2011/0216471 A1* | 9/2011 | Fukuda | C04B 35/4682 |
| | | | 361/321.4 |
| 2012/0140377 A1* | 6/2012 | Kim | H01G 4/1227 |
| | | | 361/321.2 |
| 2014/0211368 A1* | 7/2014 | Fujii | H01G 4/012 |
| | | | 361/301.4 |
| 2014/0362491 A1* | 12/2014 | Adachi | H01G 4/105 |
| | | | 361/270 |

(Continued)

FOREIGN PATENT DOCUMENTS

| JP | 2003-264118 A | 9/2003 |
| JP | 2005-203213 A | 7/2005 |

(Continued)

*Primary Examiner* — Nguyen Ha
(74) *Attorney, Agent, or Firm* — Keating & Bennett, LLP

(57) ABSTRACT

A ceramic capacitor includes first and second first internal electrodes respectively including first and second extended portions that respectively include a plurality of ceramic columns penetrating the first and the second extended portions, respectively, in a thickness direction. The first extended portion includes a first high ceramic-column density portion in which ceramic columns are provided at intervals of about 20 μm or less along the length direction of the extended portion. The second extended portion includes a second high ceramic-column density portion in which ceramic columns are provided at intervals of about 20 μm or less along the length direction of the extended portion.

18 Claims, 3 Drawing Sheets

(56) References Cited

U.S. PATENT DOCUMENTS

2016/0027569 A1* 1/2016 Inoue .................. H01F 17/0013
336/192
2016/0093443 A1* 3/2016 Hirao .................... H01G 4/012
361/301.4

FOREIGN PATENT DOCUMENTS

| JP | 2005-251893 A | 9/2005 |
| JP | 2006-140428 A | 6/2006 |

* cited by examiner

CERAMIC CAPACITOR AND METHOD FOR MANUFACTURING SAME

CROSS REFERENCE TO RELATED APPLICATIONS

This application claims the benefit of priority to Japanese Patent Application No. 2015-241215 filed on Dec. 10, 2015. The entire contents of this application are hereby incorporated herein by reference.

BACKGROUND OF THE INVENTION

1. Field of the Invention

The present invention relates to a ceramic capacitor and a method for manufacturing the ceramic capacitor.

2. Description of the Related Art

As an example of a ceramic capacitor, a ceramic capacitor including a capacitor main body made of barium titanate or the like, first and second internal electrodes disposed within the capacitor main body, a first external electrode connected to the first internal electrode, and a second external electrode connected to the second internal electrode is known (e.g., refer to JP-A-2005-203213).

In general, as a method of increasing a capacitance of the ceramic capacitor, a method of increasing an area of an internal electrode, a method of using a dielectric material having a large dielectric constant, a method of reducing a thickness of a dielectric material, and a method of increasing the number of laminations of an internal electrode are known.

For example, when a capacitance of the ceramic capacitor is increased by increasing the number of laminations of the internal electrode, it is necessary to reduce a thickness of the internal electrode. A particle diameter of a metal powder contained in a conductive paste for forming the internal electrode needs to be reduced. However, when a size of the metal powder in the conductive paste is reduced, a melting point of the metal powder is lowered. As a result, a sintered temperature of a conductive paste for forming an internal electrode is decreased, and a difference in a rate of shrinkage between the internal electrodes and the dielectric material is increased when preparing a capacitor main body by sintering. Therefore, there is a problem in that the internal electrode is split into a plurality of portions or the internal electrode is not exposed to an end surface of the capacitor main body and a contacting property between the internal electrode and the external electrode is deteriorated when preparing a ceramic capacitor main body by sintering. Accordingly, there is a problem in that the reliability of the ceramic capacitor to be manufactured is deteriorated.

SUMMARY OF THE INVENTION

Preferred embodiments of the present invention provide a ceramic capacitor having excellent reliability.

A ceramic capacitor according to a preferred embodiment of the present invention includes a capacitor main body, a first internal electrode, a second internal electrode, a first external electrode, and a second external electrode. The capacitor main body includes first and second main surfaces, first and second side surfaces, and first and second end surfaces. The first and second main surfaces extend along a length direction and a width direction. The first and second side surfaces extend along a length direction and a height direction. The first and second end surfaces extend along a width direction and a height direction. The capacitor main body includes a dielectric layer. The first internal electrode is provided within the capacitor main body. The first internal electrode extends to the first end surface. The second internal electrode is provided so as to be opposed to the first internal electrode within the capacitor main body. The second internal electrode extends to the second end surface. The first external electrode is disposed on the first end surface. The first external electrode is connected to the first internal electrode. The second external electrode is disposed on the second end surface. The second external electrode is connected to the second internal electrode. The first internal electrode includes a first opposed portion and a first extended portion. The first opposed portion is opposed to the second internal electrode. The first extended portion extends from the first opposed portion. The first extended portion extends to the first end surface. The second internal electrode includes a second opposed portion and a second extended portion. The second opposed portion is opposed to the first opposed portion. The second extended portion extends from the second opposed portion. The second extended portion extends to the second end surface. The first and second extended portions respectively include a plurality of ceramic columns penetrating the first and the second extended portions, respectively, in a thickness direction. The first extended portion includes a first high ceramic-column density portion in which the ceramic columns are provided at intervals of about 20 μm or less along the length direction of the extended portion, for example. The second extended portion includes a second high ceramic-column density portion in which the ceramic columns are provided at intervals of about 20 μm or less along the length direction of the extended portion, for example.

In the ceramic capacitor according to a preferred embodiment of the present invention, the first extended portion includes a first high ceramic-column density portion in which the ceramic columns are provided at intervals of about 20 μm or less along the length direction of the extended portion, for example. The second extended portion includes a second high ceramic-column density portion in which the ceramic columns are provided at intervals of about 20 μm or less along the length direction of the extended portion, for example. Therefore, the extended portion is firmly fixed within the capacitor main body. Accordingly, the ceramic capacitor according to a preferred embodiment of the present invention has excellent reliability.

In the ceramic capacitor according to a preferred embodiment of the present invention, preferably, the first high ceramic-column density portion is provided at an end portion on the first end surface side of the first extended portion, and the second high ceramic-column density portion is provided at an end portion on the second end surface side of the second extended portion. In this case, since electrical connection between the internal electrode and the external electrode is achieved with higher certainty, a ceramic capacitor according to a preferred embodiment of the present invention has even better reliability.

In a ceramic capacitor according to a preferred embodiment of the present invention, a ratio of the sum of lengths in the length direction of a plurality of ceramic columns included in the first high ceramic-column density portion to a length in the length direction of the first high ceramic-column density portion ((sum of lengths in length direction of a plurality of ceramic columns contained in first high ceramic-column density portion)/(length in length direction of first high ceramic-column density portion)) is preferably in a range of about 5% to about 50%, for example. By setting the ratio in this range, the reliability of the ceramic capacitor is further improved.

In a ceramic capacitor according to a preferred embodiment of the present invention, the ratio of the sum of lengths in the length direction of a plurality of ceramic columns contained in the first high ceramic-column density portion to a length in the length direction of the first high ceramic-column density portion ((sum of lengths in length direction of a plurality of ceramic columns contained in first high ceramic-column density portion)/(length in length direction of first high ceramic-column density portion)) is preferably in a range of about 10% to about 30%, for example. By setting the ratio in this range, the reliability of the ceramic capacitor is further improved.

In a ceramic capacitor according to a preferred embodiment of the present invention, a length along the length direction of each of the first and the second high ceramic-column density portions is preferably about 20 μm or more, for example. By setting the length in this range, the reliability of the ceramic capacitor is further improved.

In a ceramic capacitor according to a preferred embodiment of the present invention, in the length direction, a distance between the first opposed portion and the first high ceramic-column density portion is preferably about 20 μm or more, and in the length direction, a distance between the second opposed portion and the second high ceramic-column density portion is preferably about 20 μm or more, for example. In this case, since an oxide composition defining the first and the second high ceramic-column density portions is not diffused to the first and the second opposed portions, characteristics of the first and the second opposed portions are able to be maintained.

In a ceramic capacitor according to a preferred embodiment of the present invention, preferably, the high ceramic-column density portion in which the ceramic columns are provided at intervals of about 20 μm or less along the length direction, is not disposed in the first and the second opposed portions. By doing this, the capacitance of the ceramic capacitor is able to be increased.

A method for manufacturing a ceramic capacitor according to a preferred embodiment of the present invention includes a step of forming first and second internal electrodes by firing a conductive paste layer. A step of forming the conductive paste layer includes a step of forming a first portion for forming one of the first opposed portion and the second opposed portion by applying a first conductive paste, and a step of forming a second portion for forming one of the first extended portion and the second extended portion by applying a second conductive paste that is different from the first conductive paste. By following this step, the high ceramic-column density portion is able to be suitably formed.

In the method for manufacturing the ceramic capacitor according to a preferred embodiment of the present invention, it is preferable to use, as the second conductive paste, a conductive paste in which the ceramic particle content rate is higher than that in the first conductive paste. By doing this, the high ceramic-column density portion is able to be suitably formed.

In the method for manufacturing the ceramic capacitor according to a preferred embodiment of the present invention, it is preferable to form at least one of the first portion and the second portion by printing by a noncontact printing method. By doing this, the high ceramic-column density portion is able to be suitably formed.

In a method for manufacturing a ceramic capacitor according to a preferred embodiment of the present invention, the first portion and the second portion may be formed by printing by a noncontact printing method.

In a method for manufacturing a ceramic capacitor according to a preferred embodiment of the present invention, an inkjet printing method is preferably used as the noncontact printing method.

According to various preferred embodiments of the present invention, a ceramic capacitor having excellent reliability is provided.

The above and other elements, features, steps, characteristics and advantages of the present invention will become more apparent from the following detailed description of the preferred embodiments with reference to the attached drawings.

DETAILED DESCRIPTION OF THE INVENTION

Figure 1:
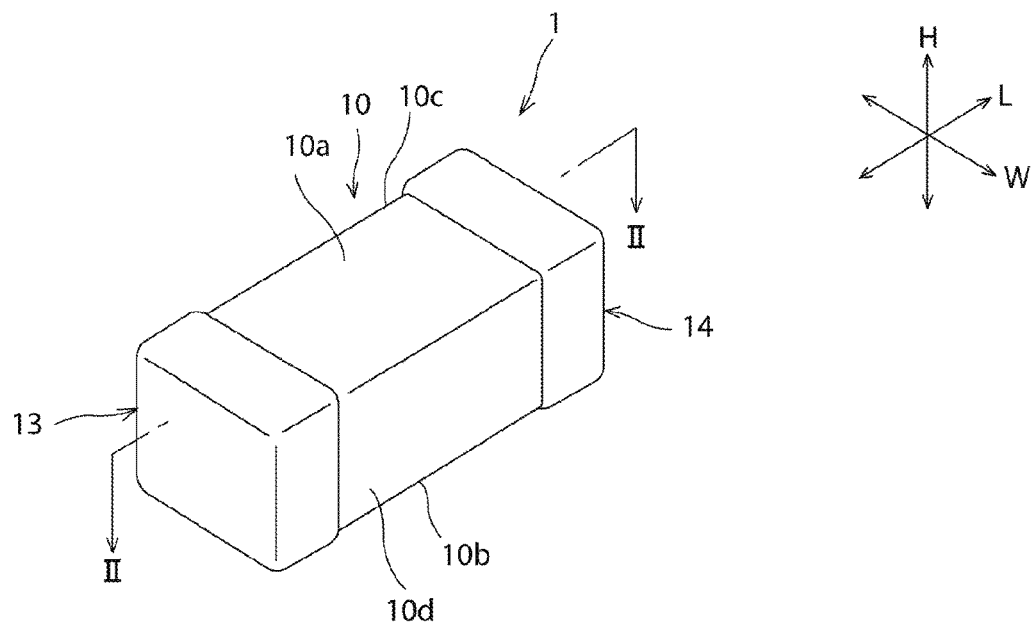
FIG. 1 is a schematic perspective view of a ceramic capacitor according to a preferred embodiment of the present invention.

Hereinafter, examples of preferred embodiments of the present invention will be described. However, the following preferred embodiments are merely examples. The present invention is not limited in any way to the preferred embodiments described below.

In each drawing figure, the members having the same or similar function are indicated with identical reference characters. Further, the drawings are schematically drawn. A scale of a dimension of an object illustrated in a drawing may be different from that of the actual object. A scale of a dimension of an object may differ between drawings. A specific scale of a dimension of an object has to be determined in consideration of the following description.

Figure 2:
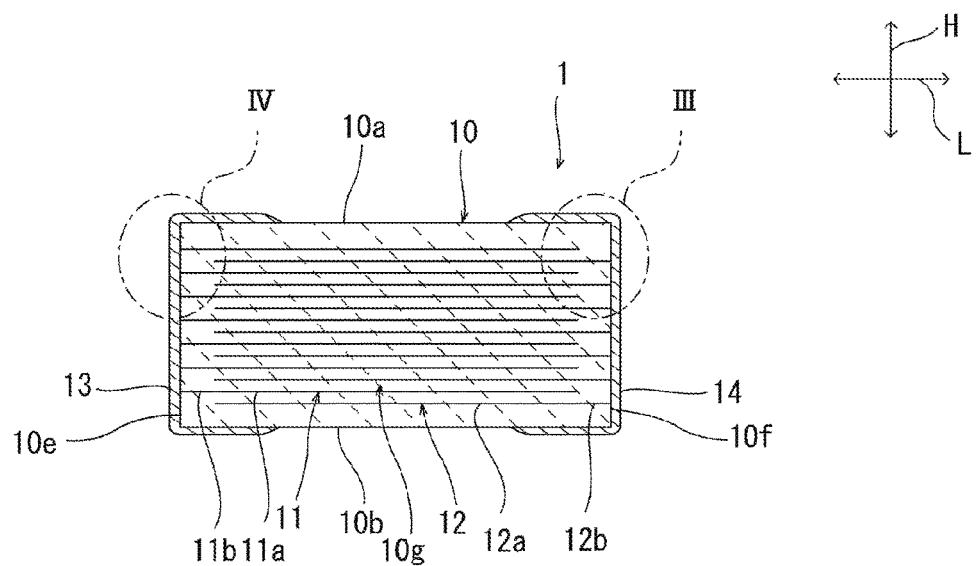
FIG. 2 is a schematic sectional view of a portion cut away by a line II-II in FIG. 1.
Figure 3:
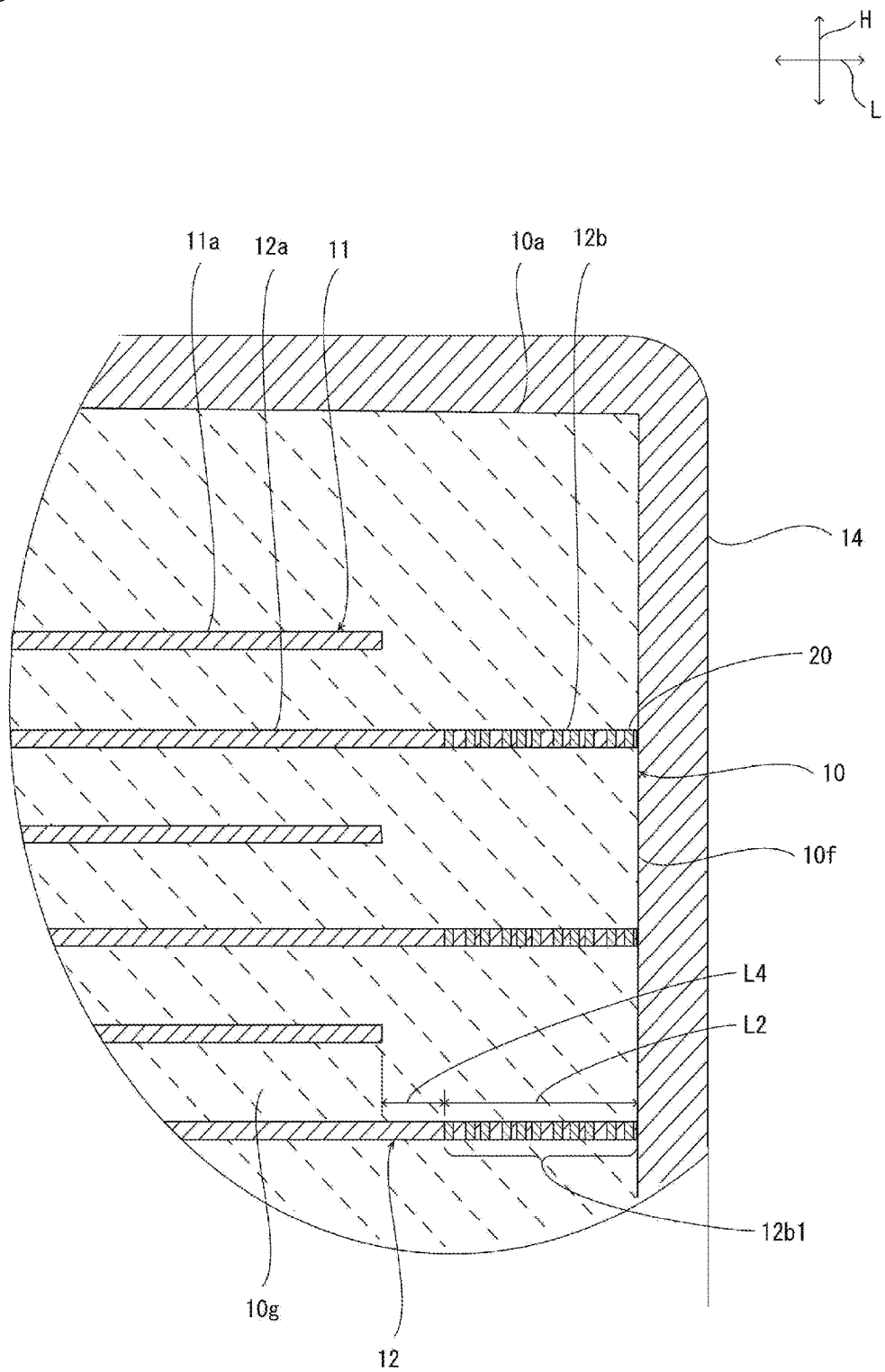
FIG. 3 is a schematic sectional view of a portion III of FIG. 2.
Figure 4:
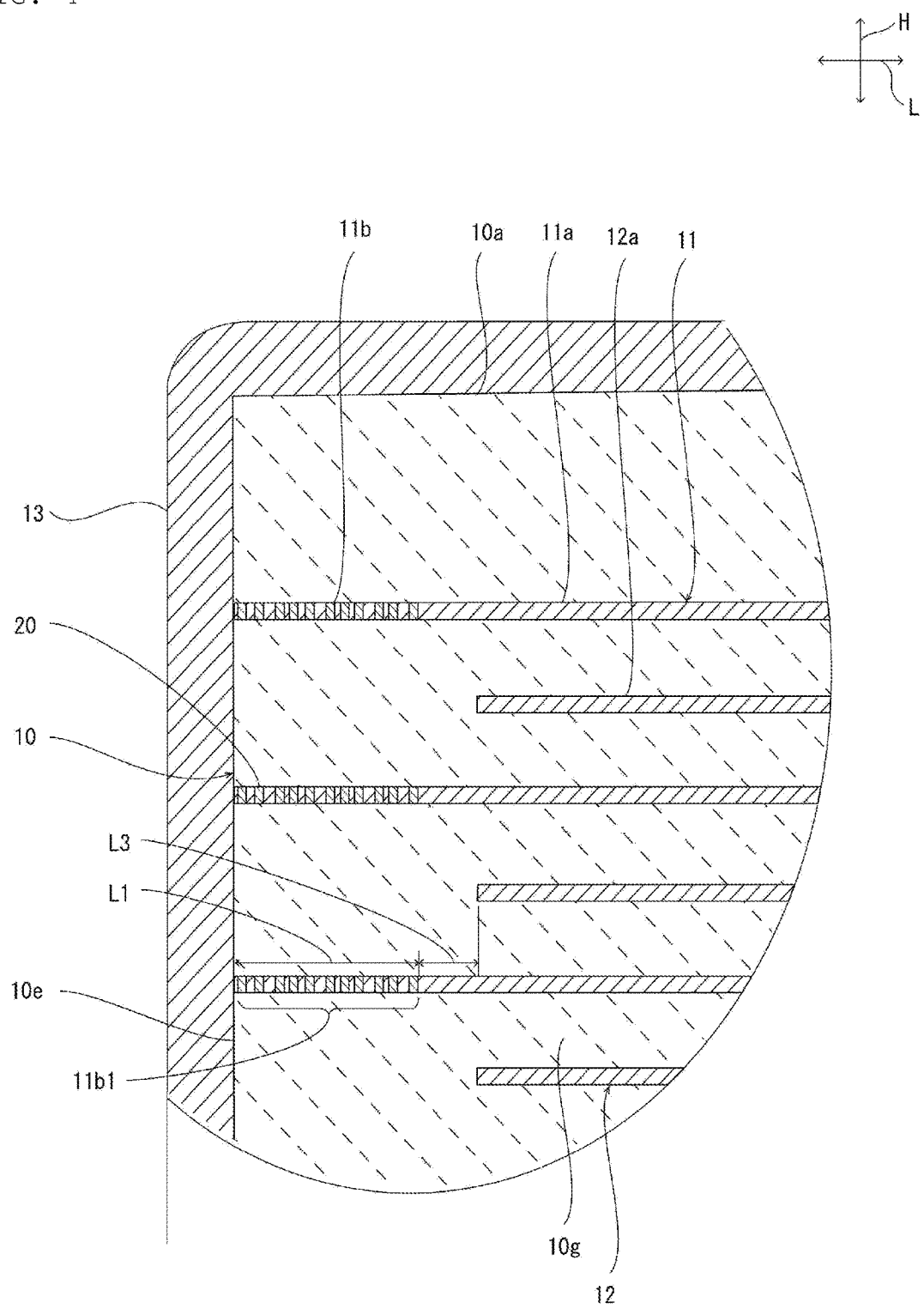
FIG. 4 is a schematic sectional view of a portion IV of FIG. 2.

FIG. 1 is a schematic perspective view of a ceramic capacitor of a preferred embodiment of the present invention. FIG. 2 is a schematic sectional view of a portion cut away by a line II-II in FIG. 1. FIG. 3 is a schematic sectional view of a portion III of FIG. 2. FIG. 4 is a schematic sectional view of a portion IV of FIG. 2.

A ceramic capacitor 1 includes a cuboid-shaped capacitor main body 10. The capacitor main body 10 includes first and second main surfaces 10a, 10b, first and second side surfaces 10c, 10d, and first and second end surfaces 10e, 10f (refer to FIG. 2). The first and the second main surfaces 10a and 10b extend along the length direction L and the width direction W. The side surfaces 10c and 10d extend along the height direction H and the length direction L. The end surfaces 10e and 10f extend along the height direction H and the width direction W. The length direction L, the width direction W and the height direction H are respectively orthogonal or substantially orthogonal to one another.

In addition, the term "cuboid shape" includes a cuboid with rounded corners or rounded edge lines. That is, "a cuboid-shaped" member means members in general having the first and the second main surfaces, two side surfaces and two end surfaces. Further, a portion of or all of the main surface, the side surface or the end surface may be provided with projections and depressions.

Dimensions of the capacitor main body 10 are not particularly limited. For example, the thickness dimension of the capacitor main body 10 is preferably at least about 0.1 mm and at most about 2.5 mm, the length dimension is preferably at least about 0.2 mm and at most about 3.2 mm, and the width dimension is preferably at least about 0.1 mm and at most about 2.5 mm.

The capacitor main body 10 is preferably made of a dielectric ceramic material and includes a plurality of dielectric layers. Specific examples of the dielectric ceramic material include $BaTiO_3$, $CaTiO_3$, $SrTiO_3$, $CaZrO_3$ and other suitable materials. A sub component such as a Mn compound, a Mg compound, a Si compound, a Fe compound, a Cr compound, a Co compound, a Ni compound and a rare-earth compound, may be appropriately added to the capacitor main body 10 based on the characteristics required for the ceramic capacitor 1.

As shown in FIG. 2, a plurality of the first internal electrodes 11 and a plurality of the second internal electrodes 12 are disposed within the capacitor main body 10. The plurality of the first internal electrodes 11 and the plurality of the second internal electrodes 12 are alternately laminated with a plurality of the dielectric layers 10g interposed therebetween.

The first internal electrode 11 is preferably rectangular or substantially rectangular. The first internal electrode 11 is disposed in parallel or substantially in parallel with the first and the second main surfaces 10a and 10b. That is, the first internal electrode 11 is disposed along the length direction L and the width direction W. The first internal electrode 11 is exposed to the end surface 10e, and is not exposed to the first and the second main surfaces 10a and 10b, the side surfaces 10c and 10d and the end surface 10f.

The second internal electrode 12 is preferably rectangular or substantially rectangular. The second internal electrode 12 is disposed in parallel or substantially in parallel with the first and the second main surfaces 10a and 10b. That is, the second internal electrode 12 is disposed along the length direction L and the width direction W. Therefore, the second internal electrode 12 is parallel or substantially parallel with the first internal electrode 11. The second internal electrode 12 is exposed to the end surface 10f, and is not exposed to the first and the second main surfaces 10a and 10b, the side surfaces 10c and 10d and the end surface 10e.

The first and the second internal electrodes 11 and 12 are alternately disposed along the height direction H. In the height direction H, the first internal electrode 11 and the second internal electrode 12 adjacent to each other are opposed to each other with the dielectric layer 10g interposed therebetween. The thickness of the dielectric layer 10g may preferably be, for example, at least about 0.5 µm and at most about 100 µm.

Specifically, the first internal electrode 11 includes a first opposed portion 11a and a first extended portion 11b. The first opposed portion 11a is opposed to the second internal electrode 12 (specifically, a second opposed portion 12a of the second internal electrode 12 described later) with the dielectric layer 10g interposed therebetween in the height direction H. The first extended portion 11b is connected to the first opposed portion 11a. The first extended portion 11b extends from the first opposed portion 11a. The first extended portion 11b extends to the first end surface 10e.

The second internal electrode 12 includes a second opposed portion 12a and a second extended portion 12b. The second opposed portion 12a is opposed to the first opposed portion 11a with the dielectric layer 10g interposed therebetween in the height direction H. The second extended portion 12b is connected to the second opposed portion 12a. The second extended portion 12b extends from the second opposed portion 12a. The second extended portion 12b extends to the second end surface 10f.

The first and the second internal electrodes 11 and 12 may be made of an appropriate conductive material. The first and the second internal electrodes 11 and 12 may preferably be made of, for example, a metal selected from the group consisting of Ni, Cu, Ag, Pd and Au, or an alloy containing one or more metals selected from the group consisting of Ni, Cu, Ag, Pd and Au (e.g., Ag—Pd alloy or other suitable alloy).

Thicknesses of the first and the second internal electrodes 11 and 12 are preferably, for example, at least about 0.2 µm and at most about 2.0 µm.

As shown in FIG. 1 and FIG. 2, the ceramic capacitor 1 includes the first and the second external electrodes 13 and 14. The first external electrode 13 is electrically connected to the first internal electrode 11 at the end surface 10e. The first external electrode 13 extends from on the first end surface 10e to on the first and the second main surfaces 10a and 10b and on the first and the second side surfaces 10c and 10d. However, the first external electrode 13 may be disposed on only the first end surface 10e. On the other hand, the second external electrode 14 is electrically connected to the second internal electrode 12 at the end surface 10f. The second external electrode 14 extends from on the second end surface 10f to on the first and the second main surfaces 10a and 10b and on the first and the second side surfaces 10c and 10d. However, the second external electrode 14 may be disposed on only the second end surface 10f.

The first and the second external electrodes 13 and 14 may preferably be made of, for example, a metal selected from the group consisting of Cu, Ni, Ag, Pd, Sn, an Ag—Pd alloy and other suitable metals or alloys. The first and second external electrodes 13 and 14 may preferably each include a laminate of a plurality of conductive layers. Specifically, the first and second external electrodes 13 and 14 may each include an underlying electrode layer and a plating layer located on the underlying electrode layer. The underlying electrode layer may include at least one selected from a baking layer, a resin layer and a thin film layer.

The baking layer preferably includes glass and metal. Examples of a metal of the baking layer include at least one selected from among Cu, Ni, Sn, Ag, Pd, an Ag—Pd alloy, Au and other suitable metals or alloys. As the glass of the baking layer, for example, a glass containing B, Si, Ba, Mg, Al, Li or other suitable claim is able to be used. The baking layer may be formed by applying a conductive paste including glass and metal onto a laminate and baking the paste. The baking layer may be fired at the same time as the internal electrode, or may be baked after firing the internal electrode. A plurality of baking layers may be formed. A thickness of the baking electrode layer (the thickest portion) is preferably in a range of about 10 µm to about 50 µm, for example.

The resin layer may include a resin layer including conductive particles and a thermosetting resin. When the resin layer is formed, a resin layer may be directly formed on the laminate without forming the baking electrode layer. A plurality of resin layers may be formed. A thickness of the resin layer (the thickest portion) is preferably in a range of about 10 µm to about 150 µm, for example.

The thin film layer may be formed by a method of forming a thin film layer such as a sputtering method or a vapor-deposition method, for example. A thickness of the thin film layer is preferably about 1 µm or less, for example.

The plating layer may be a layer including, for example, at least one selected from among Cu, Ni, Ag, Pd, an Ag—Pd alloy, Au and other suitable metal or alloy. The plating layers may include a plurality of layers. The plating layer is preferably composed of a laminate of Ni plating and Sn plating. The underlying electrode layer is able to be protected by a plating layer by disposing a plating layer made of Ni plating, for example, so as to cover the underlying electrode layer. Further, solder wettability is able to be improved and mounting of the ceramic capacitor 1 is facilitated by further disposing a Sn plating layer on the Ni plating layer. The thickness per the plating layer is preferably in a range of about 1 µm to about 15 µm, for example. As shown in FIG. 3 and FIG. 4, the first and second extended portions 11b and 12b respectively include a plurality of ceramic columns 20 penetrating the first and the second extended portions 11b and 12b, respectively, in a thickness direction (in the present preferred embodiment, a height direction H). In addition, the ceramic column is not required to be provided in only the extended portion of the internal electrode. The ceramic column may be provided, for example, in the opposed portion.

In addition, in FIG. 3 and FIG. 4, a diameter of the ceramic column 20 is shown as being constant or substantially constant in the height direction of the ceramic column 20. However, a shape of the ceramic column 20 is not limited to this. The shape of the ceramic column 20 is not particularly limited as long as it makes connection between the dielectric layers 10g above and below the internal electrode. The ceramic column 20 may have, for example, a shape in which a diameter increases toward an end from a central portion in the height direction of the ceramic column 20.

As shown in FIG. 4, in the first extended portion 11b, a first high ceramic-column density portion 11b1 is provided. The first high ceramic-column density portion 11b1 has a column structure so as to partially split the extended portion 11b of the first internal electrode 11 in a portion on the inner side of the first end surface 10e of the capacitor main body 10. The high ceramic-column density portion 11b1 refers to a portion in which intervals between ceramic columns 20 are preferably about 20 µm or less from a side of the first end surface 10e of the capacitor main body 10, for example, in the extended portion 11b of the internal electrode 11 extending inward from the first end surface 10e of the capacitor main body 10 in a specific cross section of the capacitor main body 10. A distance from the first end surface 10e of the capacitor main body 10 to a final end of the column structure in a portion where intervals between ceramic columns 20 are about 20 µm or less, corresponds to the length of the first high ceramic-column density portion 10b1.

Similarly, as shown in FIG. 3, in the second extended portion 12b, a second high ceramic-column density portion 12b1 is provided. The second high ceramic-column density portion 12b1 has a column structure so as to partially split the extended portion 12b1 of the second internal electrode 12 in a portion on the inner side of the second end surface 10f of the capacitor main body 10. The high ceramic-column density portion 12b1 refers to a portion in which intervals between ceramic columns 20 are preferably about 20 µm or less, for example, from a side of the second end surface 10f of the capacitor main body 10, for example, in the extended portion 12b of the second internal electrode 12 extending inward from the second end surface 10f of the capacitor main body 10 in a specific cross section of the capacitor main body 10. A distance from the second end surface 10f of the capacitor main body 10 to a final end of the column structure in a portion where intervals between ceramic columns 20 are about 20 µm or less, corresponds to the length of the second high ceramic-column density portion 12b1.

Since these first and the second high ceramic-column density portions 11b1 and 12b1 are provided, the ceramic columns 20 prevent the internal electrodes 11 and 12 from becoming a ball caused by liquefaction of a metal powder included in the internal electrodes 11 and 12 during firing a crude laminate at high temperature. Since the internal electrodes 11 and 12 are prevented from becoming a ball, an increase in thickness of each of the internal electrodes 11 and 12 is reduced or prevented and an amount of shrinkage of each of the internal electrodes 11 and 12 is reduced. Therefore, a difference in a rate of shrinkage between the internal electrodes 11, 12 and the dielectric layer 10g is reduced or prevented. As a result of this, splitting of the internal electrodes 11 and 12 into a plurality of portions or isolation between the internal electrodes 11, 12 and the external electrodes 13, 14, respectively, is effectively prevented. Particularly, in the present preferred embodiment, the first high ceramic-column density portion 11b1 is provided at an end portion on the first end surface 10e side of the first extended portion 11b. The first high ceramic-column density portion 11b1 extends from the first end surface 10e. The second high ceramic-column density portion 12b1 is provided at an end portion on the second end surface 10f side of the second extended portion 12b. The second high ceramic-column density portion 12b1 extends from the second end surface 10f. Therefore, isolation between the internal electrodes 11, 12 and the external electrodes 13, 14, respectively, is more effectively reduced or prevented.

From the viewpoint of further effectively reducing or preventing the splitting of the internal electrodes 11 and 12 into a plurality of portions or isolation between the internal electrodes 11, 12 and the external electrodes 13, 14, respectively, a ratio of the sum of lengths in the length direction L of a plurality of ceramic columns 20 included in the first high ceramic-column density portion 11b1 to a length L1 in the length direction L of the first high ceramic-column density portion 11b1 ((sum of lengths in length direction L of a plurality of ceramic columns 20 included in first high ceramic-column density portion 11b1)/(length L1 in length direction L of first high ceramic-column density portion 11b1)) is preferably in a range of about 5% to about 50%, and more preferably in a range of about 10% to about 30%, for example. A ratio of the sum of lengths in the length direction L of a plurality of ceramic columns 20 included in the second high ceramic-column density portion 12b1 to a length L2 in the length direction L of the second high ceramic-column density portion 12b1 ((sum of lengths in length direction L of a plurality of ceramic columns 20 included in second high ceramic-column density portion 12b1)/(length L2 in length direction L of second high ceramic-column density portion 12b1)) is preferably in a range of about 5% to about 50%, and more preferably in a range of about 10% to about 30%, for example.

As a method of determining lengths in the length direction L of a plurality of ceramic columns 20 included in the first high ceramic-column density portion 11b1, for example, in a specific cross-section of the capacitor main body 10, widths of ceramic columns 20 which are present in an area from the first end surface 10e to the first high ceramic-column density portion 11b1 in the capacitor main body 10, are each measured. At this time, the width of the ceramic column 20 is measured at a position a half of a thickness of the first internal electrode 11.

When the ratio ((sum of lengths in length direction L of a plurality of ceramic columns 20 included in first high ceramic-column density portion 11b1)/(length L1 in length direction L of first high ceramic-column density portion 11b1)), and the ratio ((sum of lengths in length direction L of a plurality of ceramic columns 20 included in second high ceramic-column density portion 12b1)/(length L2 in length direction L of second high ceramic-column density portion 12b1)) are too small, it may be impossible to effectively prevent the splitting of the extended portions 11b and 12b or the extended portions 11b and 12b unexposed to the end surfaces 10e and 10f. On the other hand, when the ratio ((sum of lengths in length direction L of a plurality of ceramic columns 20 included in first high ceramic-column density portion 11b1)/(length L1 in length direction L of first high ceramic-column density portion 11b1)), and the ratio ((sum of lengths in length direction L of a plurality of ceramic columns 20 included in second high ceramic-column density portion 12b1)/(length L2 in length direction L of second high ceramic-column density portion 12b1)) are too large, a contacting property between the internal electrodes 11, 12 and the external electrodes 13, 14 is likely to be deteriorated.

From the similar viewpoint, the lengths L1 or L2 along the length direction L of each of the first and the second high ceramic-column density portions 11b1 and 12b1 is preferably about 20 μm or more, and more preferably about 30 μm or more, for example. However, when the length L1 or L2 is too long, it may be impossible to secure the opposed portion. Accordingly, the lengths L1 and L2 are preferably about 100 μm or less, for example.

Further, when lengths L1 and L2 are too long, in the length direction L, a distance L3 between the first opposed portion 11a and the first high ceramic-column density portion 11b1, and a distance L4 between the second opposed portion 12a and the second high ceramic-column density portion 12b1 may become too small. When distances L3 and L4 are too small, areas of surfaces that are opposed to each other of the opposed portions 11a and 12a become small, and the capacitance of the ceramic capacitor 1 may become small. Accordingly, the distances L3 and L4 are preferably about 20 μm or more, and more preferably about 30 μm or more, for example.

In addition, the ceramic column 20 and the high ceramic-column density portions 11b1 and 12b1 are able to be checked in the following manner. First, the side surface 100 of the ceramic capacitor 1 is polished along the side surface 100 until a dimension in the width direction W is half or substantially half of the width of the ceramic capacitor to expose a cross-section. The ceramic columns 20, and the high ceramic-column density portions 11b1 and 12b2 are able to be checked by observing the cross section using of a scanning electron microscope. An interval between the ceramic columns 20 adjacent to each other is measured between centers in thickness directions of the internal electrodes 11 and 12.

In the ceramic capacitor 1 according to the present preferred embodiment, the high ceramic-column density portion in which the ceramic columns 20 are provided preferably at intervals of about 20 μm or less along the length direction, is not disposed in the first and the second opposed portions 11a and 12a. Therefore, areas of surfaces opposed to each other of the first opposed portion 11a and the second opposed portion 12a are large. Accordingly, the ceramic capacitor 1 has a large capacitance.

Next, a non-limiting example of a method for manufacturing a ceramic capacitor 1 will be described.

A capacitor main body 10 is prepared first. Specifically, a dielectric green sheet is prepared first by applying a dielectric paste containing a dielectric material powder in the shape of a sheet, for example, by a screen printing method, and drying the paste. Next, a conductive paste for forming an internal electrode is applied onto the dielectric green sheet. In doing so, a portion for forming opposed portions 11a and 12a, and a portion for forming extended portions 11b and 12b are separately printed. The content of ceramic particles in a second conductive paste used for printing a second portion for forming extended portions 11b and 12b is preferably set to a level higher than that of the content of ceramic particles in a first conductive paste used for printing a first portion for forming opposed portions 11a and 12a. By doing this, the high ceramic-column density portions 11b1 and 12b1 are able to be suitably formed. In addition, the first portion may be printed prior to the second portion, or the second portion may be printed prior to the first portion.

Specifically, the content of ceramic particles in the first conductive paste for printing the first portion is preferably in a range of about 0% by mass to about 13% by mass, and more preferably in a range of about 3% by mass to about 12% by mass, for example. The content of ceramic particles in the second conductive paste for printing the second portion is preferably in a range of about 13% by mass to about 35% by mass, and more preferably in a range of about 15% by mass to about 25% by mass, for example.

At least one of the first portion and the second portion is preferably printed by a noncontact printing method in order to prevent the first portion printed for forming the opposed portions 11a and 12a from contacting the second portion printed for forming the extended portions 11b and 12b to cause an abnormal pattern, such as a blur of printing and variations in thickness applied by printing.

In addition, both of the first portion and the second portion may be printed by a noncontact printing method.

Herein, the term "noncontact printing method" refers to a printing method in which a printing jig does not contact printing stocks. Specific examples of the noncontact printing method include an inkjet printing method and a dispenser printing method.

As described above, the dielectric green sheet on which a conductive pattern for the internal electrode is formed, and the dielectric green sheet on which a conductive pattern for the internal electrode is not formed are prepared. In addition, for example, a known binder or solvent may be included in the dielectric paste or the conductive paste for forming the internal electrode.

Next, a predetermined number of the dielectric green sheets on which a conductive pattern for the internal electrode is not formed, are laminated, and thereon, the dielectric green sheets on which a conductive pattern for the internal electrode is formed, are laminated in turn, and a predetermined number of the dielectric green sheets on which a conductive pattern for the internal electrode is not formed, are laminated, such that a mother laminate is prepared.

The mother laminate may be pressed in a lamination direction by, for example, an isostatic press, as required.

Next, the mother laminate is cut into a predetermined shape and dimension to prepare a plurality of crude laminates. In addition, in this time, the crude laminate may be subjected to barrel polishing to round edge lines and corners.

Next, by firing the crude laminate, a capacitor main body 10 is produced. In addition, a firing temperature of the crude laminate is appropriately set according to a ceramic material and a conductive material used. The firing temperature of the crude laminate may be, for example, in a range of about 900° C. to about 1300° C.

Next, external electrodes 13 and 14 are formed on both end surfaces 10e and 10f of the capacitor main body 10, such that a ceramic capacitor 1 is produced. The external electrodes 13 and 14 are able to be formed, for example, by a known method. The external electrodes 13 and 14 are able to be formed by an appropriate combination of, for example, baking of the conductive paste layer, a plating method, a sputtering method and a chemical vapor deposition (CVD) method.

In the above-described production method, the content of ceramic particles in the second conductive paste for printing the second portion is preferably set to a high level. Therefore, ceramic columns 20 are formed during firing the crude laminate. The ceramic columns 20 prevent the internal electrodes 11 and 12 from shrinking in the length direction L. Therefore, splitting of the internal electrodes 11 and 12 into a plurality of portions or isolation between the internal electrodes 11, 12 and the external electrodes 13, 14, respectively, is effectively reduced or prevented. Further, since a polishing step to expose the internal electrode is able to be omitted or a time required for a polishing step is able to be shortened, damages to the capacitor main body 10 are able to be effectively reduced or prevented.

Hereinafter, preferred embodiments of the present invention will be described in more detail based on specific examples; however, the present invention is not limited to the following Examples of preferred embodiments of the present invention, and variations and preferred embodiments may be appropriately made without departing from the gist of the invention.

Example 1

A ceramic capacitor having the substantially same structure as in the ceramic capacitor 1 of the above-described preferred embodiment was prepared under the following conditions by the production method described in the above-described preferred embodiment.

Dimension in a length direction of a capacitor main body (design value): about 3.2 mm Dimension in a width direction of a capacitor main body (design value): about 1.6 mm Dimension in a height direction of a capacitor main body (design value): about 2.0 mm Material of a dielectric ceramic contained in the capacitor main body: $BaTiO_3$ Capacitance of a ceramic capacitor (design value): about 10 μF Rated voltage of the ceramic capacitor: 16 V Structure of an external electrode: a laminate of an underlying electrode layer and a plating layer Underlying electrode layer: a fired electrode layer including copper (Cu) and glass Plating layer: a laminate of a nickel (Ni) plating layer and a tin (Sn) plating layer Material of an internal electrode: Ni Particle diameter of a metal particle in the internal electrode: about 0.3 μm Formation method of an opposed portion: a screen printing method Formation method of an extended portion: an inkjet printing method Content of ceramic particles in a first conductive paste: about 8% by mass Content of ceramic particles in a second conductive paste: about 20% by mass Ratio ((sum of lengths in length direction L of a plurality of ceramic columns 20 included in first high ceramic-column density portion 11b1)/(length L1 in length direction L of first high ceramic-column density portion 11b1)) and ratio ((sum of lengths in length direction L of a plurality of ceramic columns 20 included in second high ceramic-column density portion 12b1)/(length L2 in length direction L of second high ceramic-column density portion 12b1)): about 20%

L1, L2: about 50 μm

L3, L4: about 100 μm

In addition, in the following description, "ratio ((sum of lengths in length direction L of a plurality of ceramic columns 20 included in first high ceramic-column density portion 11b1)/(length L1 in length direction L of first high ceramic-column density portion 11b1)) and ratio ((sum of lengths in length direction L of a plurality of ceramic columns 20 included in second high ceramic-column density portion 12b1)/(length L2 in length direction L of second high ceramic-column density portion 12b1))" is referred to as a ratio a.

Example 2

A ceramic capacitor was prepared in the same or similar manner as in Example 1 except for using the following conditions.

L1, L2: about 30 μm

L3, L4: about 30 μm

Example 3

A ceramic capacitor was prepared in the same or similar manner as in Example 1 except for using the following conditions.

Formation method of an opposed portion: an inkjet printing method

L1, L2: about 30 μm

L3, L4: about 30 μm

Comparative Example 1

A ceramic capacitor was prepared in the same or similar manner as in Example 1 except that an opposed portion and an extended portion were printed by a screen printing method using the first conductive paste and the high ceramic-column density portion was not formed, and a time of polishing after firing was changed to about 100 minutes.

Comparative Example 2

A ceramic capacitor was prepared in the same or similar manner as in Comparative Example 1 except for changing a time of polishing after firing to about 30 minutes.

Comparative Example 3

A ceramic capacitor was prepared in the same or similar manner as in Comparative Example 1 except that polishing was not performed after firing.

Comparative Example 4

A ceramic capacitor was prepared in the same or similar manner as in Example 1 except that both of an opposed portion and an extended portion were formed by a screen printing method and the high ceramic-column density portion was not formed, and a time of polishing after firing was changed to about 100 minutes.

First, the ceramic capacitor was polished along the side surface until a dimension in the width direction W is half or substantially half of the width of the ceramic capacitor. Thereafter, the polished ceramic capacitor was subjected to chemical etching to elute the external electrode. Next, in the cross section, with respect to the extended electrodes of layers (18 layers in total) of three first internal electrodes and three second internal electrodes, respectively randomly extracted, in each of three regions of a lower region, a central region and an upper region of the ceramic capacitor, a distance from the end surface of the ceramic capacitor to a final end of the column structure in a portion where intervals between column structures are present at about 20 μm or less, was measured using a scanning electron microscope (magnification of 3000 times), and a dimension of each portion was measured based on the resulting images of the scanning electron microscope. In addition, a ceramic capacitor in which intervals between column structures are not present at about 20 μm or less from the end surface, was considered not to have the high ceramic-column density portion.

First, the ceramic capacitor was polished along the side surface until a dimension in the width direction W is half or substantially half of the width of the ceramic capacitor. Thereafter, the polished ceramic capacitor was subjected to chemical etching to elute the external electrode. Next, in the cross section, with respect to the extended electrodes of layers (18 layers in total) of three first internal electrodes and three second internal electrodes, respectively randomly extracted, in each of three regions of a lower region, a central region and an upper region of the ceramic capacitor, a distance between the first and the second opposed portions and the first and the second high ceramic-column density portions was measured using a scanning electron microscope (magnification of 3000 times), and a dimension of each portion was measured based on the resulting images of the scanning electron microscope. In addition, a ceramic capacitor in which intervals between column structures are not present at about 20 μm or less from the end surface, was considered not to have the high ceramic-column density portion.

A capacitance of each of the samples prepared in the Examples and the Comparative Examples was measured, and a value (ratio) of a measurement value of the capacitance divided by a capacitance (design value: 10 μF) of the ceramic capacitor was determined. As a result of this, the case in which the determined ratio is about 100% or more was rated as "⊙", the case of about 95% or more and less than about 100% was rated as "○", the case of about 50% or more and less than about 95% was rated as "Δ", and the case of less than about 50% was rated as "x".

One thousand capacitor main bodies prepared in the Examples and the Comparative Examples were observed using a microscope, and a capacitor main body not having a crack or chip of about 50 μm or more was rated as "○", and a capacitor main body having such a crack or chip was rated as "x".

First, the ceramic capacitor was polished along the side surface until a dimension in the width direction W is half or substantially half of the width of the ceramic capacitor. Thereafter, the polished ceramic capacitor was subjected to chemical etching to elute the external electrode. Next, in the cross section, with respect to the extended electrodes of layers (18 layers in total) of three first internal electrodes and three second internal electrodes, respectively randomly extracted, in each of three regions of a lower region, a central region and an upper region of the ceramic capacitor, the ratio a was determined from a ratio of the total width of the ceramic columns present in the high ceramic-column density portion to the length of the high ceramic-column density portion. The width of the ceramic column was measured at a position half or substantially half of a thickness of the first internal electrode.

TABLE 1

| | Time of Polishing after Firing (min) | Presence or Absence of High Ceramic-Column Density Portion | L1, L2 (μm) | L3, L4 (μm) | Contacting Property | Crack, Chip (%) |
|---|---|---|---|---|---|---|
| Example 1 | 30 | Present | 50 | 100 | ⊙ | 0 |
| Example 2 | 30 | Present | 30 | 30 | ⊙ | 0 |
| Example 3 | 30 | Present | 30 | 30 | ⊙ | 0 |
| Comparative Example 1 | 100 | Absent | 0 | 0 | ⊙ | 1.2 |
| Comparative Example 2 | 30 | Absent | 0 | 0 | Δ | 0 |
| Comparative Example 3 | 0 | Absent | 0 | 0 | x | 0 |
| Comparative Example 4 | 100 | Absent | 0 | 0 | ⊙ | 1.2 |

Example 5

A ceramic capacitor was prepared in the same or similar manner as in Example 1 except for changing the ratio a to about 5%.

Example 6

A ceramic capacitor was prepared in the same or similar manner as in Example 1 except for changing the ratio a to about 10%.

Example 7

A ceramic capacitor was prepared in the same or similar manner as in Example 1 except for changing the ratio a to about 30%.

Example 8

A ceramic capacitor was prepared in the same or similar manner as in Example 1 except for changing the ratio a to about 40%.

Example 9

A ceramic capacitor was prepared in the same or similar manner as in Example 1 except for changing the ratio a to about 50%.

Comparative Example 5

A ceramic capacitor was prepared in the same or similar manner as in Example 1 except that the ratio a was changed to about 60% and the high ceramic-column density portion was not formed.

TABLE 2

| | Ratio a (%) | Presence or Absence of High Ceramic-Column Density Portion | L1, L2 (μm) | L3, L4 (μm) | Contacting Property | Crack, Chip (%) |
|---|---|---|---|---|---|---|
| Example 1 | 20 | Present | 50 | 100 | ⊙ | 0 |
| Example 5 | 5 | Present | 50 | 100 | ◯ | 0 |
| Example 6 | 10 | Present | 50 | 100 | ⊙ | 0 |
| Example 7 | 30 | Absent | 50 | 100 | ⊙ | 0 |
| Example 8 | 40 | Absent | 50 | 100 | ◯ | 0 |
| Example 9 | 50 | Absent | 50 | 100 | ◯ | 0 |
| Comparative Example 2 | 0 | Absent | 0 | 0 | Δ | 0 |
| Comparative Example 5 | 60 | Absent | 0 | 0 | Δ | 0 |

Example 10

A ceramic capacitor was prepared in the same or similar manner as in Example 1 except for changing L1, L2 and L3, L4 to values shown in Table 3 below.

Example 11

A ceramic capacitor was prepared in the same or similar manner as in Example 1 except for changing L1, L2 and L3, L4 to values shown in Table 3 below.

Example 12

A ceramic capacitor was prepared in the same or similar manner as in Example 1 except for changing the ratio a, L1, L2 and L3, L4 to values shown in Table 3 below.

TABLE 3

| | Ratio a (%) | Presence or Absence of High Ceramic-Column Density Portion | L1, L2 (μm) | L3, L4 (μm) | Contacting Property | Crack, Chip (%) |
|---|---|---|---|---|---|---|
| Example 1 | 20 | Present | 50 | 100 | ⊙ | 0 |
| Example 10 | 20 | Present | 30 | 120 | ⊙ | 0 |
| Example 11 | 20 | Present | 20 | 130 | ⊙ | 0 |
| Example 12 | 10 | Absent | 10 | 145 | ◯ | 0 |

Example 13 to Example 19

A ceramic capacitor was prepared in the same or similar manner as in Example 1 except for changing L1, L2 and L3, L4 to values shown in Table 4 below.

TABLE 4

| | Ratio a (%) | Presence or Absence of High Ceramic-Column Density Portion | L1, L2 (μm) | L3, L4 (μm) | Contacting Property | Crack, Chip (%) |
|---|---|---|---|---|---|---|
| Example 1 | 20 | Present | 50 | 100 | ⊙ | 0 |
| Example 10 | 20 | Present | 30 | 120 | ⊙ | 0 |
| Example 13 | 20 | Present | 100 | 50 | ⊙ | 0 |
| Example 14 | 20 | Present | 110 | 40 | ⊙ | 0 |
| Example 15 | 20 | Present | 120 | 30 | ⊙ | 0 |
| Example 16 | 20 | Present | 130 | 20 | ⊙ | 0 |
| Example 17 | 20 | Present | 50 | 50 | ⊙ | 0 |
| Example 18 | 20 | Present | 50 | 20 | ⊙ | 0 |
| Example 19 | 20 | Present | 50 | 10 | ◯ | 0 |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A ceramic capacitor comprising:
    a capacitor main body including first and second main surfaces extending along a length direction and a width direction, first and second side surfaces extending along a length direction and a height direction, and first and second end surfaces extending along a width direction and a height direction and includes at least one dielectric layer;
    a first internal electrode provided within the capacitor main body and extended to the first end surface;
    a second internal electrode opposed to the first internal electrode within the capacitor main body and extended to the second end surface;
    a first external electrode disposed on the first end surface and connected to the first internal electrode; and
    a second external electrode disposed on the second end surface and connected to the second internal electrode; wherein
    the first internal electrode includes:
        a first opposed portion which is opposed to the second internal electrode; and
        a first extended portion which extends from the first opposed portion and to the first end surface;
    the second internal electrode includes:
        a second opposed portion which is opposed to the first opposed portion; and
        a second extended portion which extends from the second opposed portion and to the second end surface;
    the first and the second extended portions respectively including a plurality of ceramic columns penetrating the first and the second extended portions in a thickness direction;
    the first extended portion includes a first high ceramic-column density portion in which the ceramic columns are provided at intervals of about 20 μm or less along the length direction of the extended portion; and
    the second extended portion includes a second high ceramic-column density portion in which the ceramic columns are provided at intervals of about 20 μm or less along the length direction of the extended portion.

2. The ceramic capacitor according to claim 1, wherein
the first high ceramic-column density portion is provided at an end portion on a first end surface side of the first extended portion; and
the second high ceramic-column density portion is provided at an end portion on a second end surface side of the second extended portion.

3. The ceramic capacitor according to claim 1, wherein a ratio of a sum of lengths in the length direction of a plurality of ceramic columns included in the first high ceramic-column density portion to a length in the length direction of the first high ceramic-column density portion is in a range of about 5% to about 50%.

4. The ceramic capacitor according to claim 3, wherein the ratio of the sum of lengths in the length direction of a plurality of ceramic columns included in the first high ceramic-column density portion to a length in the length direction of the first high ceramic-column density portion is in a range of about 10% to about 30%.

5. The ceramic capacitor according to claim 1, wherein a length along the length direction of each of the first and the second high ceramic-column density portions is about 20 μm or more.

6. The ceramic capacitor according to claim 1, wherein
in the length direction, a distance between the first opposed portion and the first high ceramic-column density portion is about 20 μm or more; and
in the length direction, a distance between the second opposed portion and the second high ceramic-column density portion is about 20 μm or more.

7. The ceramic capacitor according to claim 1, wherein the high ceramic-column density portion in which the ceramic columns are provided at intervals of about 20 μm or less along the length direction, is not disposed in the first and the second opposed portions.

8. The ceramic capacitor according to claim 1, wherein a thickness dimension of the capacitor main body is in a range of about 0.1 mm to about 2.5 mm, a length dimension of the capacitor main body is in a range of about 0.2 mm to about 3.2 mm, and a width dimension of the capacitor main body is in a range of about 0.1 mm to about 2.5 mm.

9. The ceramic capacitor according to claim 1, wherein the at least one dielectric layer is made of a dielectric ceramic material.

10. The ceramic capacitor according to claim 9, wherein the dielectric ceramic material includes at least one of $BaTiO_3$, $CaTiO_3$, $SrTiO_3$, and $CaZrO_3$.

11. The ceramic capacitor according to claim 10, wherein the dielectric ceramic material further includes a sub component including at least a Mn compound, a Mg compound, a Si compound, a Fe compound, a Cr compound, a Co compound, a Ni compound and a rare-earth compound.

12. The ceramic capacitor according to claim 1, wherein the at least one dielectric layer includes a plurality of dielectric layers.

13. The ceramic capacitor according to claim 1, wherein a thickness of each of the at least one dielectric layer is in a range of about 0.5 μm to about 100 μm.

14. A method for manufacturing the ceramic capacitor according to claim 1, the method comprising:
a step of forming the first and second internal electrodes by firing a conductive paste layer;
a step of forming the conductive paste layer including:
a step of forming a first portion for forming one of the first opposed portion and the second opposed portion by applying a first conductive paste; and
a step of forming a second portion for forming one of the first extended portion and the second extended portion by applying a second conductive paste different in a type from the first conductive paste.

15. The method for manufacturing the ceramic capacitor according to claim 14, wherein a conductive paste having a ceramic particle content rate that is higher than that in the first conductive paste is used as the second conductive paste.

16. The method for manufacturing the ceramic capacitor according to claim 14, wherein at least one of the first portion and the second portion is formed by printing by a noncontact printing method.

17. The method for manufacturing the ceramic capacitor according to claim 16, wherein the first portion and the second portion are formed by printing by a noncontact printing method.

18. The method for manufacturing the ceramic capacitor according to claim 16, wherein an inkjet printing method is used as the noncontact printing method.

* * * * *